UNITED STATES PATENT OFFICE.

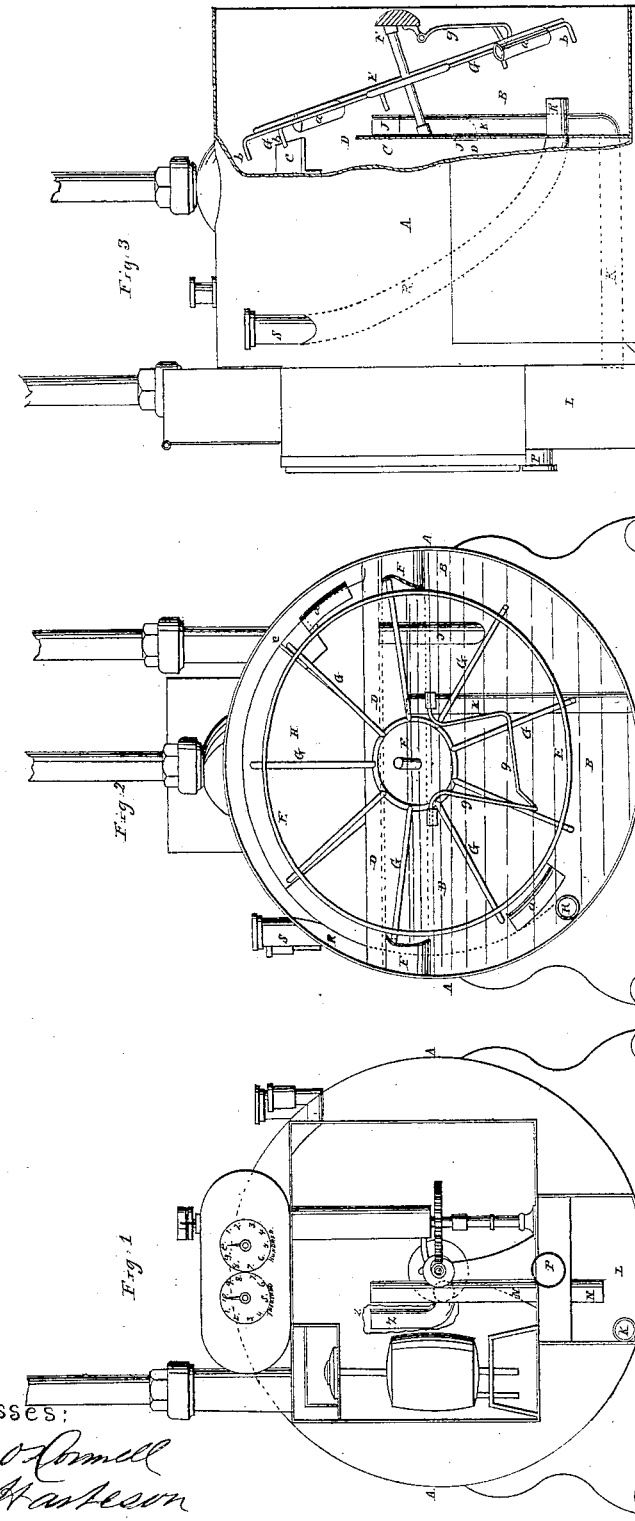

THOMAS B. FOGARTY, OF CHARLESTON, SOUTH CAROLINA.

IMPROVEMENT IN GAS-METERS.

Specification forming part of Letters Patent No. 26,423, dated December 13, 1859.

*To all whom it may concern:*

Be it known that I, THOMAS B. FOGARTY, of the city and district of Charleston, and State of South Carolina, have invented a new and useful Improvement in Gas-Meters; and I do hereby declare that the following is a full, clear, and exact description of the same, reference being had to the accompanying drawings, forming a part of this specification, in which—

Figure 1 is a view of the meter with the front removed, showing the interior of the same. Fig. 2 is a back view of the meter, showing the feed-wheel and the interior of the meter from this view; and Fig. 3 is a side view showing the feed-wheel and reservoir in elevation by removing a part of the outer casing.

Similar letters of reference in each of the several figures indicate corresponding parts.

The nature of my invention consists, first, in the combination of an inclined wheel with a separate water-reservoir and the measuring-drum, the periphery of said wheel having suitable buckets arranged on it, so as to dip up the water contained in said reservoir as the wheel is operated by the drum and convey the same into the measuring-chamber, thereby maintaining a correct water-line under all ordinary circumstances and effecting an equitable registration of gas, which is a great desideratum both to the company and consumer; second, in the within-described method of preventing the meter-chamber and the water-reservoir from being overcharged, and, third, in the arrangement of the water-inlet pipe, so that it will have no communication with the body of the meter-chamber, while it has free communication with the water-reservoir.

To enable others skilled in the art to make and use my invention, I will proceed to describe its construction and operation.

A is the meter-case, considerably elongated, so that a supply-reservoir, B, may be formed at the back of the meter, as shown by Figs. 2 and 3 of the drawings. This reservoir is separated from the working parts contained in the measuring-drum chamber C by a partition, D, which is somewhat higher than the water-line. (Indicated by dotted red lines in Fig. 2.) Within this supply-reservoir B is arranged an inclined feed-wheel, E, having its axial bearings in a cross-bar, F, and in a socket fixed to the partition D. On the outer rim or periphery of this feed-wheel are arranged buckets *a a*, one or more, as found necessary. The radial arms G pass out beyond the circumference of the wheel and are turned over at right angles, this bent portion being represented by *b*. The wheel E, constructed and arranged as above described, is operated by projecting lugs *c c*, fixed upon the side of the measuring-drum H, and connecting at intervals with the bent portion *b* of the wheel E above the water-line, so as to turn this wheel as the measuring-drum revolves, bringing at every half-revolution of the wheel one of the buckets *a* over the reservoir C opposite the partition D and raising the water from the reservoir B and depositing it in C, it being evident that while there is any water contained in reservoir B it will be carried into the working parts of the meter by the buckets *a a*, as described, dispensing at the same time with a stuffing-box and complicated mechanism, which have been employed in several meters to accomplish this object. The wheel E is prevented from turning backward by the hanging arm *g*. Within the reservoir are also arranged overflow-pipes J K. The pipe J communicates with the reservoir C through partition D and extends up to the water-line of both reservoirs B C. The pipe K extends up to near the water-line and communicates from the reservoir B to the dry well L by passing through the case A. Thus it will be seen that the meter-chamber cannot be overcharged, for it is evident that as soon as it is filled above the water-level the surplus water returns to the reservoir through the overflow-pipe J, the height of which may be regulated by a piece of pipe screwed into it at top or otherwise, according to the views of the maker. The pipe K prevents the water-chamber from being overcharged by filling above the water-level, for if any attempt be made to overcharge the reservoir this pipe is overflowed and the water descends into the dry well L, and if it continues to rise it enters the pipe N, which communicates by a branch or elbow, Z, (not shown exactly in its position in the drawings,) with the pipe which introduces the gas to the measuring-chamber of the meter.

I also dispense with the ordinary water-line screw, as any surplus water in the reservoir B can be drawn off by the front screw, P, the dry well being connected with the reservoir and also with the body of the meter by the pipes K N, as described.

The pipe through which water is supplied to the water-chamber B is represented by S R. This inlet-pipe is placed so that it passes through the drum-chamber and division-plate D of the water-reservoir, and thus has no direct communication with the drum-chamber of the meter, but communicates with the reservoir. This arrangement allows of the supply end of the pipe being at the front of the meter, while its rear end is at the back of the same and renders it impossible for the consumer to extract water from the drum-chamber, and also affords greater convenience. With ordinary arrangements the water is easily extracted from the drum chamber either through the water-line screw-hole or the water-inlet.

The register-wheels, measuring drum, and the several parts of the meter not described are in all respects similar to those in common use. Therefore it is not necessary to have special reference thereto.

What I claim as my invention, and desire to secure by Letters Patent, is—

1. The combination, with the water reservoir B and the revolving measuring-drum H, of an inclined feed-wheel, E, substantially as and for the purposes set forth.

2. The arrangement of the overflow-pipe K, in combination with the water-reservoir, meter-chamber, and dry well L, and pipe N, in the manner substantially as set forth.

3. The arrangement of the water-inlet S R, substantially in the manner and for the purposes herein set forth.

THOS. B. FOGARTY.

Witnesses:
   I. B. O'DONNELL,
   I. S. HARTESON.